(12) United States Patent
Yoon et al.

(10) Patent No.: US 8,019,318 B2
(45) Date of Patent: Sep. 13, 2011

(54) MOBILE DEVICE POSITIONING SYSTEM AND METHOD OF OPERATING THE SAME

(75) Inventors: Jung-min Yoon, Seoul (KR); Yong-deok Kim, Anyang-si (KR); Byung-seog Baek, Suwon-si (KR); Joung-hoon Choo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1209 days.

(21) Appl. No.: 11/581,601

(22) Filed: Oct. 17, 2006

(65) Prior Publication Data
US 2007/0087773 A1    Apr. 19, 2007

(30) Foreign Application Priority Data

Oct. 17, 2005    (KR) .......................... 10-2005-0097591

(51) Int. Cl.
*H04M 11/04*    (2006.01)
(52) U.S. Cl. ..................................... 455/404.2; 455/441
(58) Field of Classification Search ............... 455/456.1, 455/414.1, 457, 426.1, 574, 343.2, 404, 506, 455/441, 404.2
See application file for complete search history.

(56) References Cited

U.S. PATENT DOCUMENTS

| | | | |
|---|---|---|---|
| 7,016,687 B1 * | 3/2006 | Holland | 455/456.1 |
| 2002/0115436 A1 * | 8/2002 | Howell et al. | 455/426 |
| 2005/0266860 A1 * | 12/2005 | Tamaki et al. | 455/456.6 |

FOREIGN PATENT DOCUMENTS

| | | |
|---|---|---|
| CN | 1458754 A | 11/2003 |
| JP | 10-107722 A | 4/1998 |
| JP | 11-178066 A | 7/1999 |
| JP | 11-298945 A | 10/1999 |
| JP | 2001-292469 A | 10/2001 |
| JP | 2002-054944 A | 2/2002 |
| JP | 2004-364167 A | 12/2004 |
| KR | 10-2003-0042396 A | 5/2003 |

* cited by examiner

*Primary Examiner* — Tu Nguyen
(74) *Attorney, Agent, or Firm* — Sughrue Mion, PLLC

(57) ABSTRACT

A mobile device positioning system and a method of operating the same are provided that can reduce the power consumption of the mobile device. The position-information transmitting apparatus of the mobile device includes a data-receiving module receiving positioning data from a mobile device, a moving-speed calculation module calculating a moving speed of the mobile device according to the received data, and generating transmission time interval information to transmit the data for positioning according to the calculated moving speed, a data-transmitting module transmitting the generated transmission time interval information and the position information of the mobile device to the mobile device, and a load-adjustment module determining a load according to the mobile device having requested the position information, and adjusting the generated transmission time interval information according to the determined load.

29 Claims, 11 Drawing Sheets

MOBILE DEVICE POSITIONING SYSTEM AND METHOD OF OPERATING THE SAME

CROSS-REFERENCE TO RELATED APPLICATION

This application is based on and claims priority from Korean Patent Application No. 10-2005-0097591, filed on Oct. 17, 2005, the disclosure of which is incorporated herein in its entirety by reference.

BACKGROUND OF THE INVENTION

1. Field of the Invention

The present invention relates to a mobile device positioning system and a method of operating the same, and more particularly to a mobile device positioning system and a method of operating the same that can reduce the power consumption of the mobile device.

2. Description of the Related Art

A related art mobile communication device (a "mobile device"), such as a portable phone, personal digital assistant (PDA), or other devices, must know its position in order to increase the efficiency of communications such as voice calls and other communications.

Related art mobile devices determine their own position by periodically transmitting data to inform a base station that manages a cell, to which the mobile device belongs, of its position. Then, the base station transmits position information according to the received data to the mobile device.

FIG. 1 is a block diagram illustrating the construction of a related art mobile device positioning system, including a position-information receiving apparatus 10 transmitting positioning data of the mobile device, and receiving the position information according to the transmitted data, and a position-information transmitting apparatus 20 judging the position information according to the data received from the position-information receiving apparatus 10, and transmitting the determined position information to the position-information receiving apparatus 10. In this case, the position information receiving deice 10 may be a mobile device, and the position-information transmitting apparatus 20 may be a base station.

The position-information receiving apparatus 10 includes a communication module 11 for data communications, a position-information module 12 generating and transmitting data for positioning of the mobile device to the position-information transmitting apparatus 20 through the communication module 11, and receiving the position information according to the transmitted data through the communication module 11, and a power control module 13 controlling the power supply to the position-information module 12 and the communication module 11 at predetermined intervals.

If the position-information receiving apparatus 10 continuously transmits data, its power consumption will be large. In order to reduce the power consumption, the power control module 13 controls the power supplied to the communication module 11 at predetermined intervals so that the position-information receiving apparatus 10 can transmit positioning data at predetermined intervals.

The position-information transmitting apparatus 20 includes a data-receiving module 21 receiving the positioning data transmitted by the position-information receiving apparatus 10, a position-information determining module 22 determining the position information of the mobile device according to the received data, a storage module 23 storing the determined position information, and a data-transmitting module 24 transmitting the determined position information to the position-information receiving apparatus 10.

FIG. 2 is a view explaining the operation of a related art mobile device positioning system. The position-information receiving apparatus 10 first transmits the position information generated by the position-information determining module 12 to the position-information transmitting apparatus 20 through the communication module 11 S10.

The position-information determining module 22 of the position-information transmitting apparatus 20 determines the position information according to the data received through the data-receiving module 21, and transmits the position information to the position-information receiving apparatus 10 through the data-transmitting module 24 (S20).

Thereafter, the power control module 13 of the position-information receiving apparatus 10 turns off the power supply to the communication module 11 (S30).

After the lapse of a predetermined time period, the power control module 13 turns on the power supply to the communication module 11 (S40), and the position-information receiving apparatus 10 and the position-information transmitting apparatus 20 perform the data transmission for positioning (S50) and the position information transmission according to the transmitted data (S60), respectively, in the same manner as the above-described operations S10 and S20. Thereafter, the position-information receiving apparatus and the position-information transmitting apparatus repeat the operations of the above-described operations S30 to S60.

In the related art mobile device positioning system as described above, a time interval for supplying the power to the communication module 11 is predetermined irrespective of the moving speed of the mobile device.

FIG. 3 is a view illustrating transmission time intervals at which the related art position-information receiving apparatus 10 transmits positioning data according to the moving speed of a mobile device. Even when the moving speed of the mobile device is changed to a first moving speed, a second moving speed, and a third moving speed over time, the time for turning off/on the power supplied to the communication module 11 is kept constant. In this case, when the power of the communication module 11 is turned on, the data for the positioning is transmitted.

In other words, on the assumption that times for turning off/on the power being supplied to the communication module 11 in periods of the first moving speed, second moving speed, and third moving speed are T1, T2, and T3, respectively, the relation among T1, T2, and T3 is T1=T2=T3.

However, the power consumption of the mobile device is increased due to the position-information receiving apparatus 10 transmitting data for positioning to the position-information transmitting apparatus 20 at predetermined intervals, irrespective of the moving speed of the mobile device.

For example, if the moving speed of the mobile device is low, the amount of positional change of the device per unit time is small, while if the moving speed of the device is high, the amount of positional change of the device per unit time is large.

Accordingly, even when the moving speed of the mobile device is low and thus frequent updating of the position information of the mobile device is not required, the power supplied to the communication module 11 is turned on/off at the same time interval as the case in which the moving speed of the mobile device is high, and thus the power consumption of the mobile device is increased, which in turn causes the use time of the mobile device to be reduced.

On the other hand, if the mobile device is located in a specified cell, it requests the position information from a base station that manages the corresponding cell. Accordingly, if a large number of mobile devices exist in the corresponding cell and simultaneously request position information from the base station, the base station cannot secure sufficient quality of service (QoS).

Japanese Patent Unexamined Publication No. 1999-298945 discloses a method for reducing power consumption of a mobile terminal whereby a base station measures the moving speed of a mobile terminal, and transmits a position registration period that corresponds to the measured speed to the mobile terminal, and the mobile terminal transmits a position registration message according to the received period. Although this reference discloses a power reduction method whereby the mobile terminal transmits the position registration message according to the period transmitted by the base station, it fails to disclose any detailed means for reducing the power consumption of the mobile terminal. In addition, this reference fails to disclose any scheme for securing sufficient QoS when plural mobile terminals simultaneously transmit the position registration messages to the base station.

SUMMARY OF THE INVENTION

The present invention provides a mobile device positioning system and a method of operating the same that can reduce the power consumption of a mobile device and secure sufficient a good quality of service (QoS).

According to an aspect of the present invention, there is provided a position-information receiving apparatus of a mobile device that includes a communication module for data communications, a position-information module transmitting positioning data to a position-information providing device through the communication module, and receiving the position information according to the transmitted data through the communication module, and a power control module controlling a power supply to the communication module according to the received position information.

According to another aspect of the present invention, there is provided a position-information transmitting apparatus of a mobile device that includes a data-receiving module receiving positioning data from a mobile device, a moving-speed calculation module calculating a moving speed of the mobile device according to the received data, and generating transmission time interval information for transmitting the data for the positioning according to the calculated moving speed, a data-transmitting module transmitting the generated transmission time interval information and the position information of the mobile device to the mobile device, and a load-adjustment module determining a load according to the mobile device having requested the position information, and adjusting the generated transmission time interval information according to the determined load.

According to still another aspect of the present invention, there is provided a position-information receiving method for a mobile device, which includes transmitting positioning data to a position-information providing device, receiving the position information according to the transmitted data, and controlling a transmission time interval of the data for positioning according to the received position information.

According to still another aspect of the present invention, there is provided a position-information transmitting method for a mobile device that includes receiving positioning data from a mobile device, calculating a moving speed of the mobile device according to the received data, and generating transmission time interval information for transmitting the data for the positioning according to the calculated moving speed, transmitting the generated transmission time interval information and the position information of the mobile device to the mobile device, and determining a load according to the mobile device having requested the position information and adjusting the generated transmission time interval information according to the determined load.

BRIEF DESCRIPTION OF THE DRAWINGS

The above and other aspects of the present invention will become apparent from the following detailed description of exemplary embodiments taken in conjunction with the accompanying drawings, in which.

DETAILED DESCRIPTION OF THE EXEMPLARY EMBODIMENTS

Figure 1:
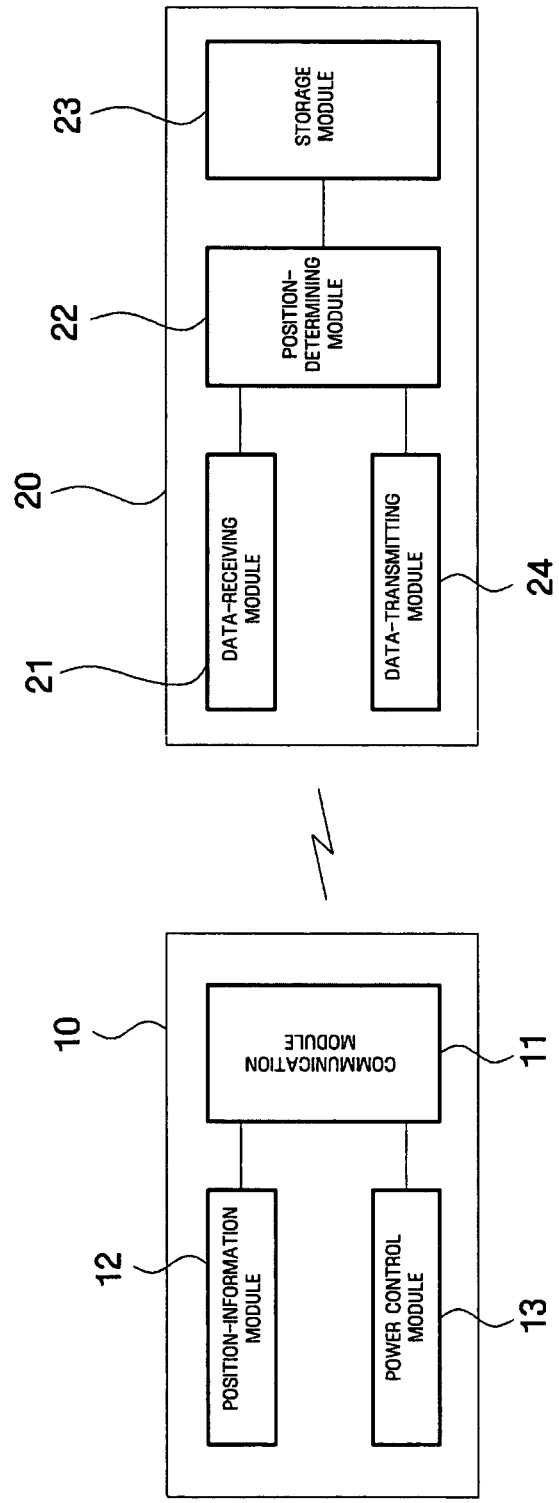
FIG. 1 is a block diagram illustrating the construction of a related art mobile device positioning system.
Figure 2:
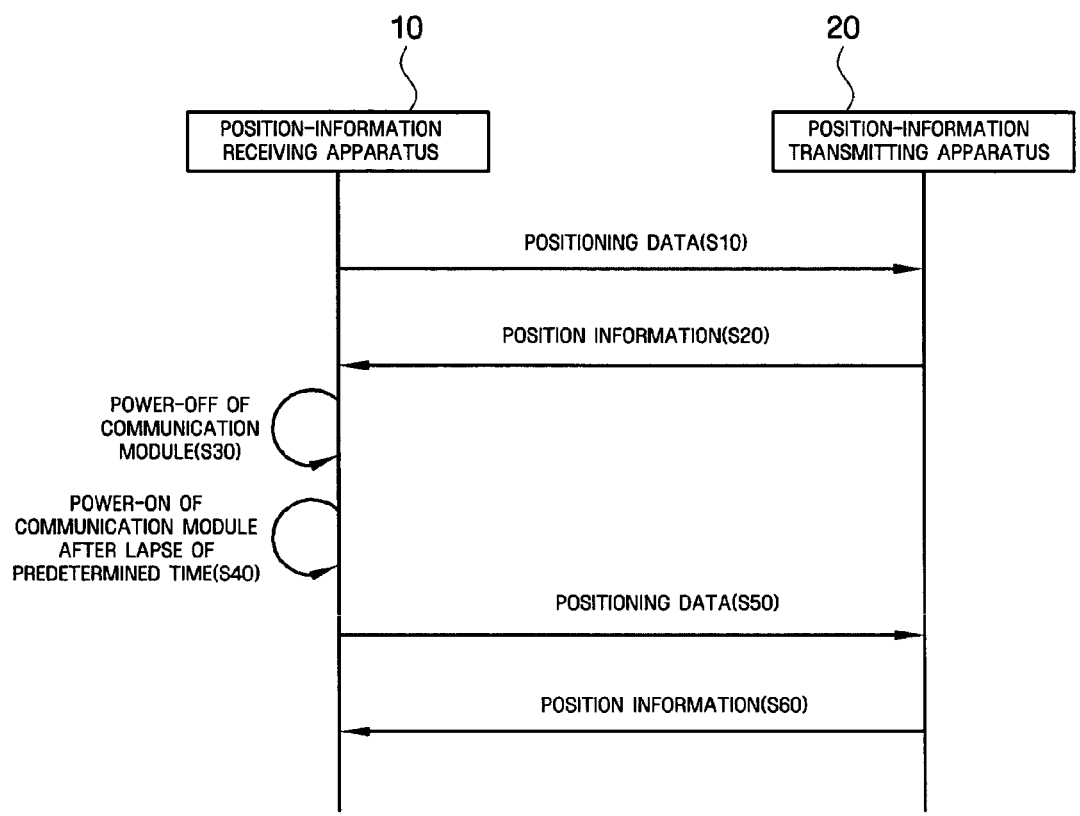
FIG. 2 is a view explaining the operation of a related art mobile device positioning system.
Figure 3:
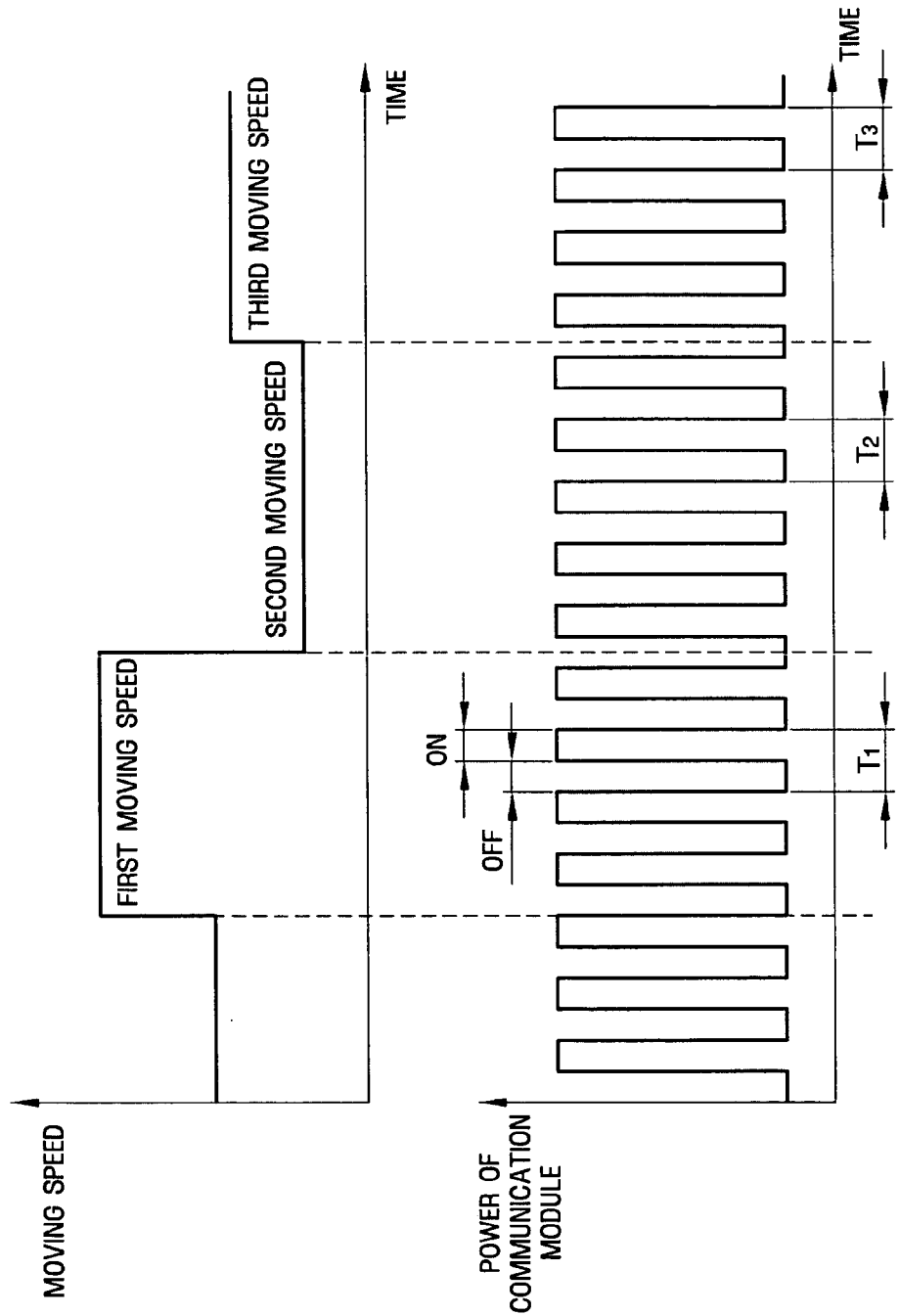
FIG. 3 is a view illustrating transmission time intervals of positioning data according to the moving speed of a mobile device according to the related art.

Hereinafter, exemplary embodiments of the present invention will be described in detail with reference to the accompanying drawings. The aspects and features of the present invention and methods for achieving the aspects and features will be apparent by referring to the exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are provided to assist those of ordinary skill in the art in a comprehensive understanding of the exemplary embodiment with respect to the appended claims. In the present written description, the same drawing reference numerals are used for the same elements across various figures.

The exemplary embodiments will be described herein with reference to the accompanying drawings illustrating block diagrams and flowcharts for explaining a mobile device positioning system and a method for operating the same. It will be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus create means for implementing the functions specified in the flowchart block or blocks.

These computer program instructions may be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operations to be performed in the computer or other programmable apparatus to produce a computer implemented process such that the instructions that are executed on the computer or other programmable apparatus provide steps for implementing the functions specified in the flowchart block or blocks.

Also, each block of the flowchart illustrations may represent a module, segment, or portion of code that includes one or more executable instructions for implementing the specified logical function(s). It should also be noted that in some alternative implementations, the functions noted in the blocks may occur in an alternative sequence. For example but not by way of limitation, two blocks shown in succession may in fact be executed substantially concurrently or the blocks may sometimes be executed in reverse order depending upon the functionality involved.

Figure 4:
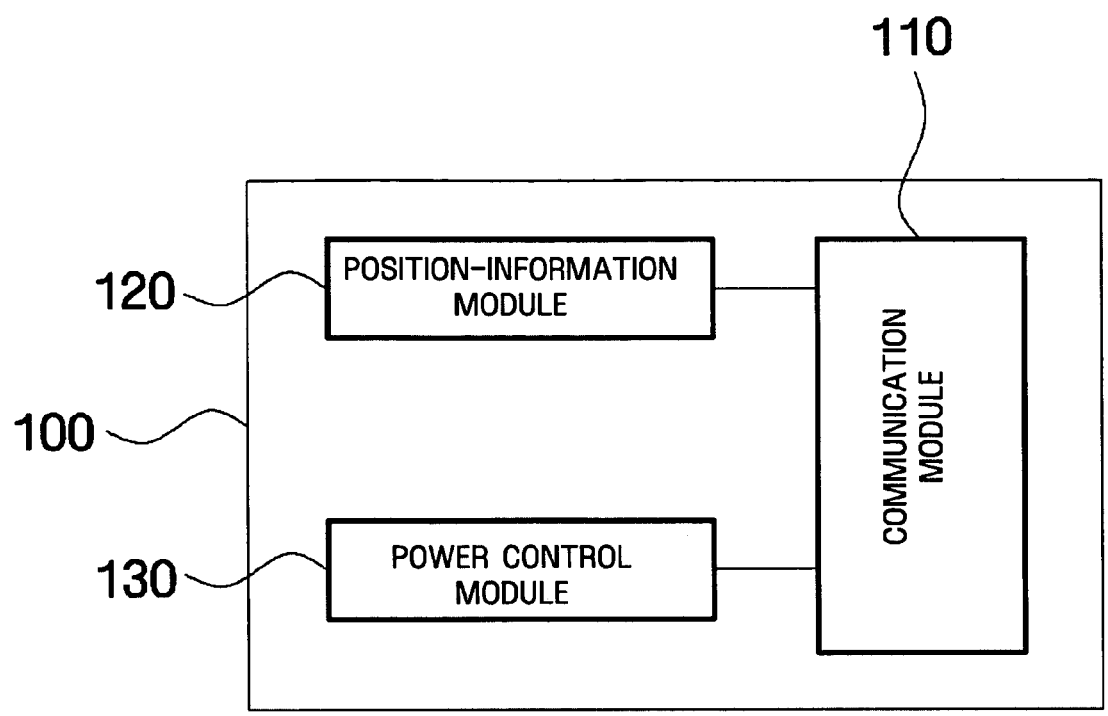
FIG. 4 is a block diagram illustrating the construction of a position-information receiving apparatus of a mobile device according to a first exemplary embodiment of the present invention.

FIG. 4 is a block diagram illustrating the construction of a position-information receiving apparatus of a mobile device according to a first exemplary embodiment of the present invention.

The position-information receiving apparatus 100 of a mobile device according to the first exemplary embodiment includes a communication module 110, a position-information module 120 transmitting positioning data to a position-information providing device through the communication module 110, and receiving the position information according to the transmitted data through the communication nodule 110, and a power control module 130 controlling a power supply to the communication module 110 according to the received position information.

In the present exemplary embodiment, the position-information receiving apparatus 100 may be a mobile device such as a portable phone, a personal digital assistant (PDA), a device built in the mobile device, or a separate device detachably mounted on the mobile device. However, the present invention is not limited thereto, and other mobile devices as would be understood by those of ordinary skill in the art may be used.

The communication module 110 enables the position-information receiving apparatus 100 to transmit/receive data through wireless communication. The position-information receiving apparatus 100 can transmit the data for positioning to the position-information providing device through the communication module 110, and receive the position information.

The position-information module 120 can generate and transmit the data for the positioning to the position-information providing device. Also, the position-information module 120 can receive the position information transmitted by the position-information providing device according to the transmitted data through the communication module 110. In this case, the received position information may include position coordinates of the mobile device, for example, x and y coordinates, or a latitude and longitude, and transmission time interval information for transmitting the data for positioning.

In the present exemplary embodiment, the received position information includes the position coordinates and the transmission time interval information. However, this is merely exemplary, and the position information may include diverse additional services.

The transmission time interval information is determined according to the moving speed of the position-information receiving apparatus 100. If the moving speed of the position-information receiving apparatus is high, the amount of positional change of the device per unit time will be large, while if the moving speed of the device is low, the amount of positional change of the device per unit time will be small.

Accordingly, in order to reduce the power consumed by the mobile device, a time interval for transmitting the data for positioning should be adjusted. The power control module 130 can adjust the time interval for transmitting the data for positioning by controlling the power being supplied to the communication module 110 according to the transmission time interval included in the received position information. Accordingly, if the moving speed of the position-information receiving apparatus 100 is low, the power control module 130 increases the time interval for supplying the power to the communication module 110 so as to reduce the power consumption of the mobile device.

Figure 5:
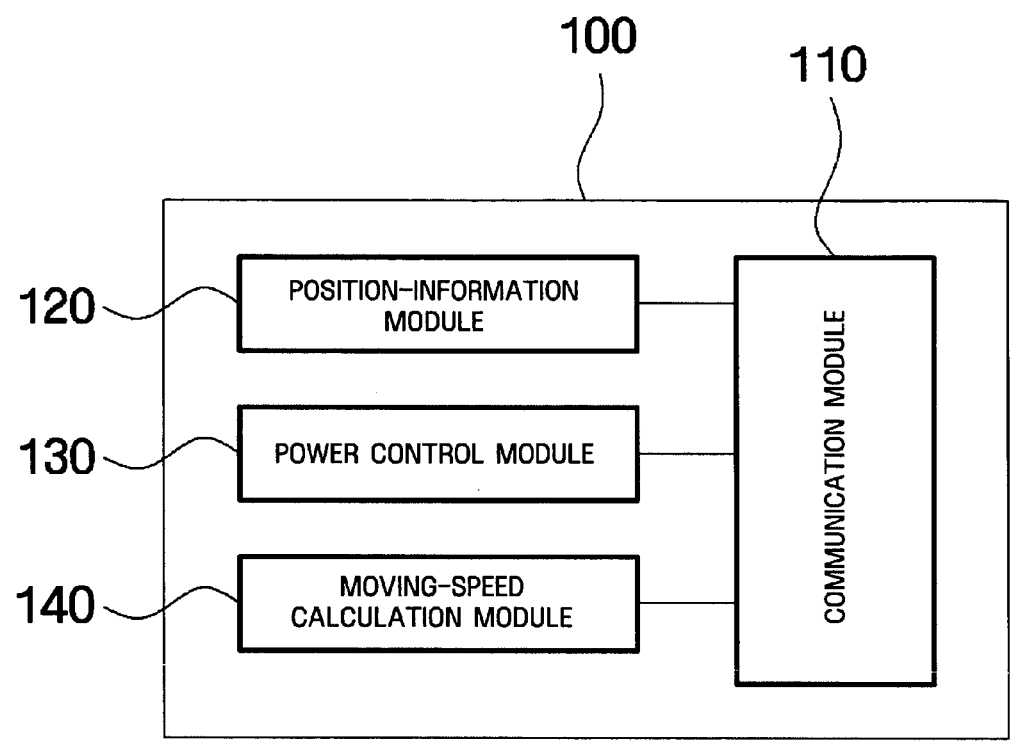
FIG. 5 is a block diagram illustrating the construction of a position-information receiving apparatus of a mobile device according to a second exemplary embodiment of the present invention.

FIG. 5 is a block diagram illustrating the construction of a position-information receiving apparatus of a mobile device according to a second exemplary embodiment of the present invention. The position-information receiving apparatus of a mobile device according to the second exemplary embodiment further includes a moving-speed calculation module 140 capable of determining the transmission time interval of the data for positioning according to the received position information, in comparison to the position-information receiving apparatus 100 of FIG. 4.

The moving-speed calculation module 140 calculates the moving speed of the position-information receiving apparatus 100 according to a moving distance of the position-information receiving apparatus 100 that is obtained from the time interval for transmitting the data for positioning and the received position information, generates and transfers the transmission time interval information, which is for transmitting the data for positioning according to the calculated moving speed, to the power control module 130.

The power control module 130 controls the power being supplied to the communication module 110 according to the transmission time interval information transferred from the moving-speed calculation module 140, in the substantially same manner as the transmission time interval information received from the position-information providing device.

Figure 6:
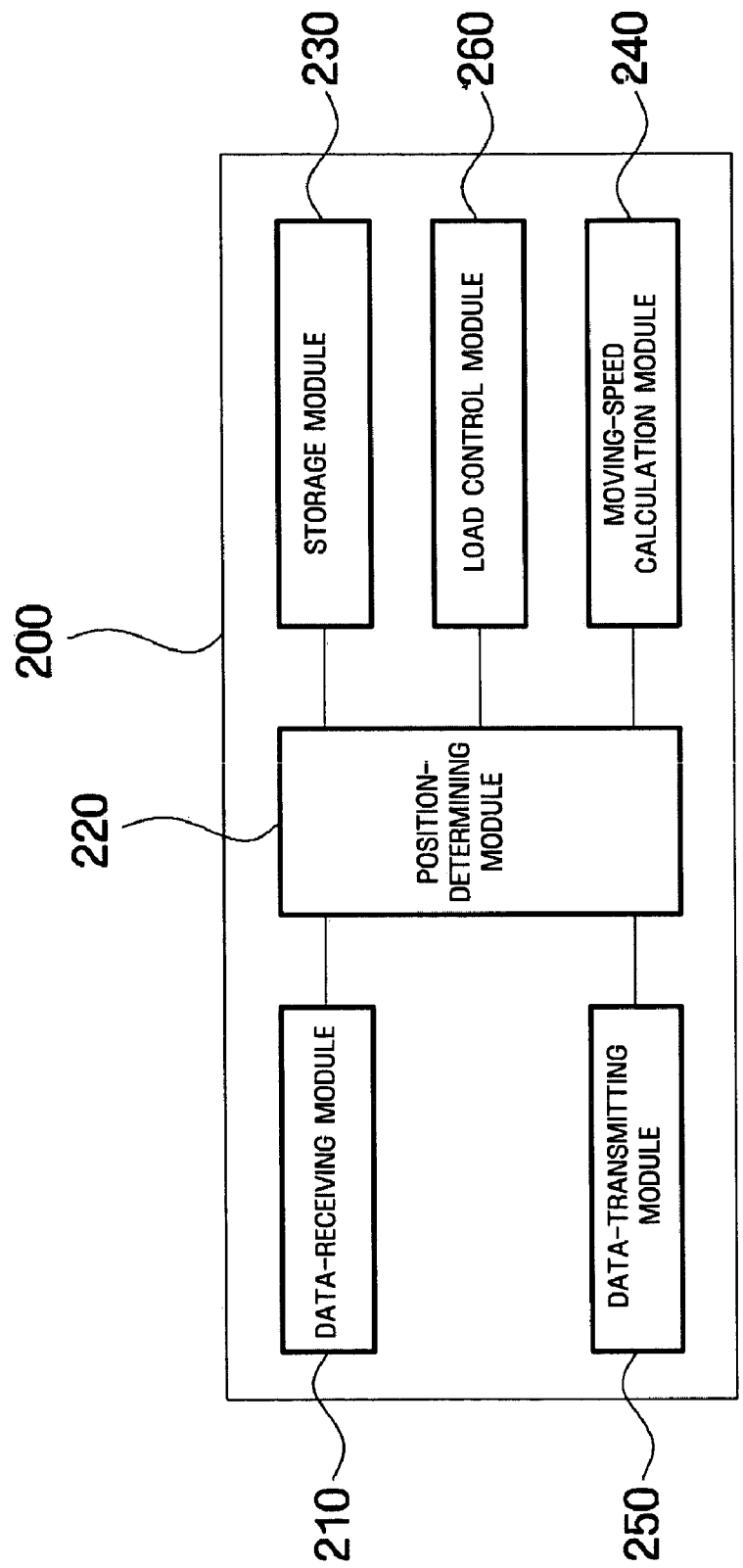
FIG. 6 is a block diagram illustrating the construction of a position-information transmitting apparatus for a mobile device according to an exemplary embodiment of the present invention.

FIG. 6 is a block diagram illustrating the construction of a position-information transmitting apparatus for a mobile device according to an exemplary embodiment. The position-information transmitting apparatus 200 includes a data-receiving module 210 receiving the data for positioning transmitted from the position-information receiving apparatus 100, a position judgment module 220 judging (or determining) the position information of the position-information receiving apparatus 100 according to the received data, a storage module 230 storing the judged position information, a moving-speed calculation module 240 calculating the moving speed of the position-information receiving apparatus 100 according to the received data, and generating the transmission time interval information according to the calculated moving speed, a data-transmitting module 250 transmitting the generated transmission time interval information and the position information according to the received data to the position-information receiving apparatus 100, and a load-adjustment (or control) module 260 judging a load according to the position-information receiving apparatus having requested the position information, and adjusting the transmission time interval information according to the judged load.

In the exemplary embodiment, the position-information transmitting apparatus 200 may be understood as a base station that manages a cell in which the position-information receiving apparatus 100 is located, and if plural cells exist, plural base stations managing the cells, respectively, may exist.

The moving-speed calculation module 240 can calculate the moving speed of the position-information receiving apparatus 100 according to the moving distance of the position-information receiving apparatus 100 obtained according to a reception interval of the data for positioning transmitted from the position-information receiving apparatus 100 and the position information judged by the position-information determining module 220 according to the received data. Also, the moving-speed calculation module 240 can generate the transmission time interval information of the data for positioning transmitted from the position-information receiving apparatus 100 according to the calculated moving speed. This transmission time interval information is determined according to the moving speed of the position-information receiving apparatus 100.

If the moving speed of the position-information receiving apparatus 100 is high, the amount of positional change of the device per unit time becomes large, while if the moving speed of the device is low, the amount of positional change of the device per unit time becomes small. Accordingly, a time interval for transmitting the data for positioning is adjusted according to the moving speed of the position-information receiving apparatus 100.

Consequently, the transmission time interval of the data for positioning transmitted from the position-information receiving apparatus 100 is adjusted according to the transmission time interval information generated by the moving-speed calculation module 240, i.e., according to the moving speed of the position-information receiving apparatus, and thus the power being consumed by the position-information receiving apparatus 100 can be substantially reduced.

If plural position-information receiving apparatuses request the position information, the load is increased, and thus sufficient QoS may not be secured. To address this possibility, the load-adjustment module 260 adjusts the transmission time interval information generated according to the number of position-information receiving apparatuses having requested the position information and the transmission time interval information of the respective position-information receiving apparatuses. In this case, the load W can be obtained according to the total number of position information devices and the sum of multiplications of the respective position-information receiving apparatuses by the corresponding transmission time interval information:

$$W=(N_1+N_2+\ldots+N_n)/(S_1{}^*N_1+S_2{}^*N_2+\ldots+S_n{}^*N_n) \quad (1)$$

where $N_1+N_2+\ldots+N_n$ denotes the total number of position-information receiving apparatuses having requested the position information, and $S_1{}^*N_1+S_2{}^*N_2+\ldots+S_n{}^*N_n$ denotes the sum of multiplications of the respective position-information receiving apparatuses by the corresponding transmission time interval information.

The transmission time interval information of the respective position-information receiving apparatuses are used in Equation 1 because the load may be increased if the transmission time intervals of the respective position-information receiving apparatuses are short, even if a substantially small number of position-information receiving apparatuses have requested the position information.

If the load obtained through Equation 1 exceeds a reference load, the load-adjustment module 260 can recalculate and adjust the transmission time intervals being transmitted through the data-transmitting module 250. For example, when the load obtained by Equation 1 exceeds the reference load, the load-adjustment module can increase the transmission time intervals generated from the moving-speed calculation module 240.

Figure 7:
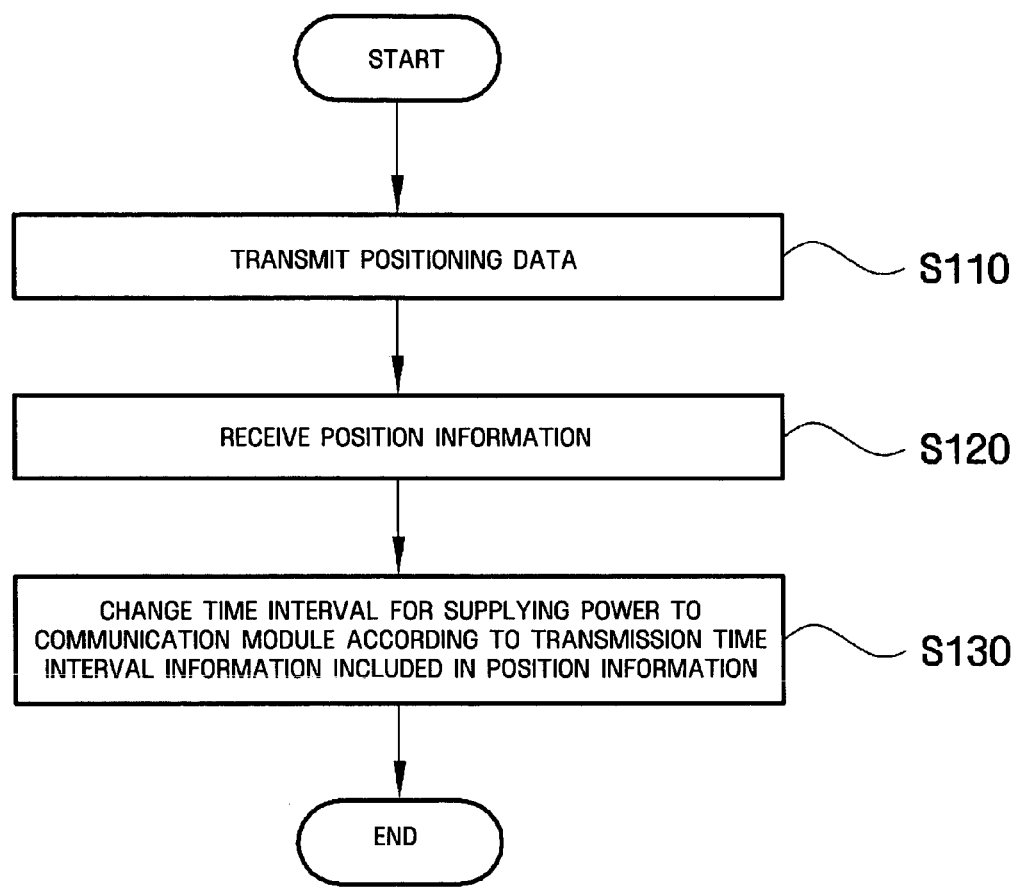
FIG. 7 is a flowchart illustrating a position-information receiving method for a mobile device according to a first exemplary embodiment of the present invention.

FIG. 7 is a flowchart illustrating a position-information receiving method of a mobile device according to a first exemplary embodiment. It is exemplified that the method of FIG. 7 is performed by the position-information receiving apparatus of FIG. 4 as described above. The position-information receiving apparatus 100 of a mobile device located in a specified cell first transmits positioning data to the position-information transmitting apparatus 200 that manages the corresponding cell at intervals (S110). In this case, the transmission time interval for transmitting the position information may be a transmission time interval transmitted from the cell in which the mobile device was previously located, a transmission time interval, or a transmission time interval determined as a default, but is not limited thereto.

Then, the position-information receiving apparatus 100 receives the position information according to the transmitted data for positioning (S120). In this case, the received position information may include transmission time interval information for transmitting the data for positioning according to the moving speed of the position information device 100, or position coordinates, but is not limited thereto.

The position-information receiving apparatus 100 changes a time interval of the power supply to the communication module 110 that transmits the data for positioning according to the received transmission time interval information (S130). In other words, the position-information receiving apparatus 100 supplies the power to the communication module 110 that transmits the data for positioning according to the transmission time interval information generated according to the moving speed of the position-information receiving apparatus 100, and thus the power consumption can be substantially reduced.

Then, the position-information receiving apparatus receives the transmission time interval information, and repeats the process of supplying the power to the communication module 110 according to the received transmission time interval information (i.e., operations S110 to S130).

Figure 8:
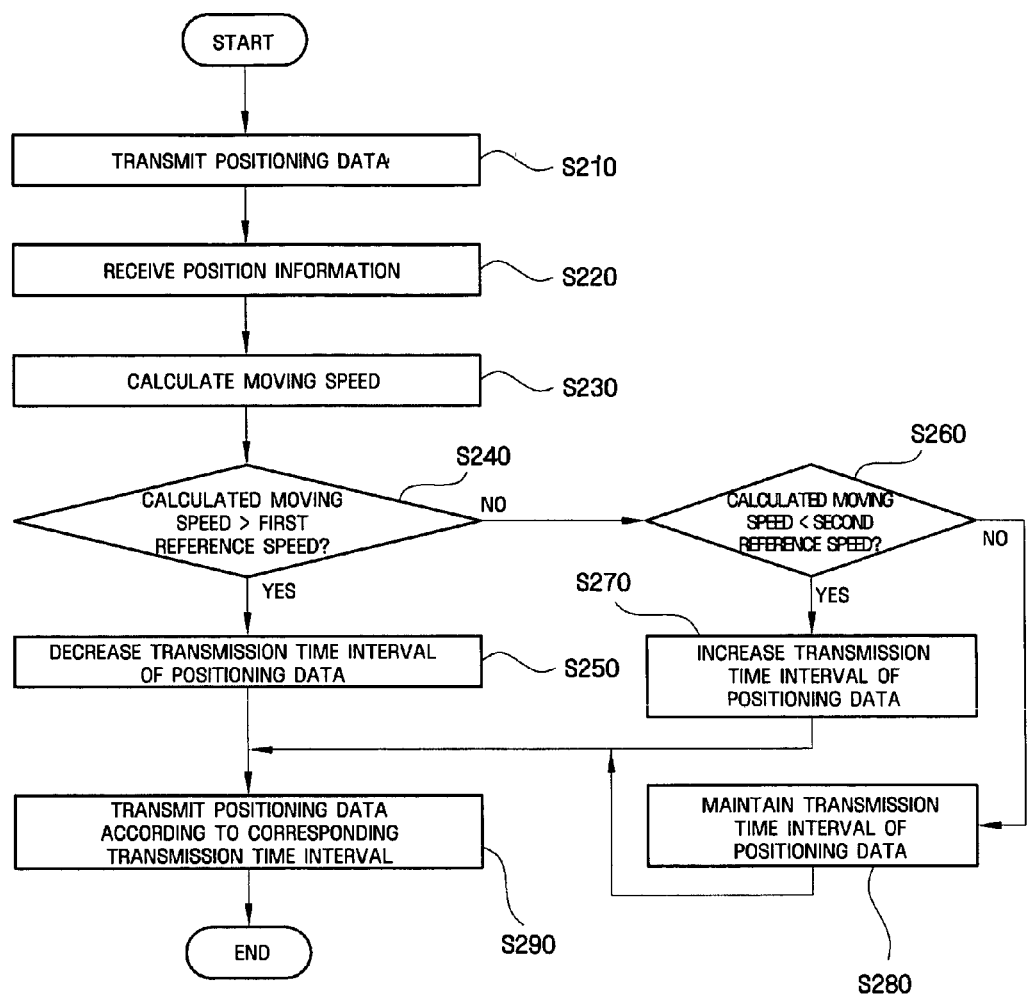
FIG. 8 is a flowchart illustrating a position-information receiving method for a mobile device according to a second exemplary embodiment of the present invention.

FIG. 8 is a flowchart illustrating a position-information receiving method for a mobile device according to a second exemplary embodiment of the present invention. Unlike the method as illustrated in FIG. 7, the position-information receiving apparatus adjusts the transmission time interval for transmitting the data for positioning according to the moving speed of the mobile device. In this exemplary embodiment, it is exemplified that the method of FIG. 8 may be performed by the position-information receiving apparatus of FIG. 5 as described above, and a first reference speed is higher than a second reference speed.

As illustrated in FIG. 8, the position-information receiving apparatus 100 of a mobile device that is located in a specified cell first transmits positioning data to the position-information transmitting apparatus 200 that manages the corresponding cell at intervals (S210). Then, the position-information receiving apparatus 100 receives the position information according to the transmitted data for positioning (S220).

Then, the moving-speed calculation module 140 of FIG. 5 calculates the moving speed of the position-information receiving apparatus 100 through the moving distance of the position-information receiving apparatus 100 obtained according to a reception time interval of the received position information and the position information (S230).

In this case, the moving-speed calculation module 140 reduces the transmission time interval if the calculated moving speed exceeds the first reference speed (S240).

If the calculated moving speed is lower than the second reference speed (S260), the moving-speed calculation module 140 increases the transmission time interval (S270).

If the calculated moving speed is between the first reference speed and the second reference speed, the moving-speed calculation module 140 maintains the transmission time interval (S280).

Thereafter, the power control module 130 transmits the data for positioning according to the corresponding transmission time interval (S290).

Also, the moving-speed calculation module repeats the process of calculating the moving speed of the position-information receiving apparatus 100 according to the received position information, generating the transmission time interval information according to the calculated moving speed, and transmitting the data for positioning according to the generated transmission time interval information (i.e., operations S210 to S290).

Figure 9:
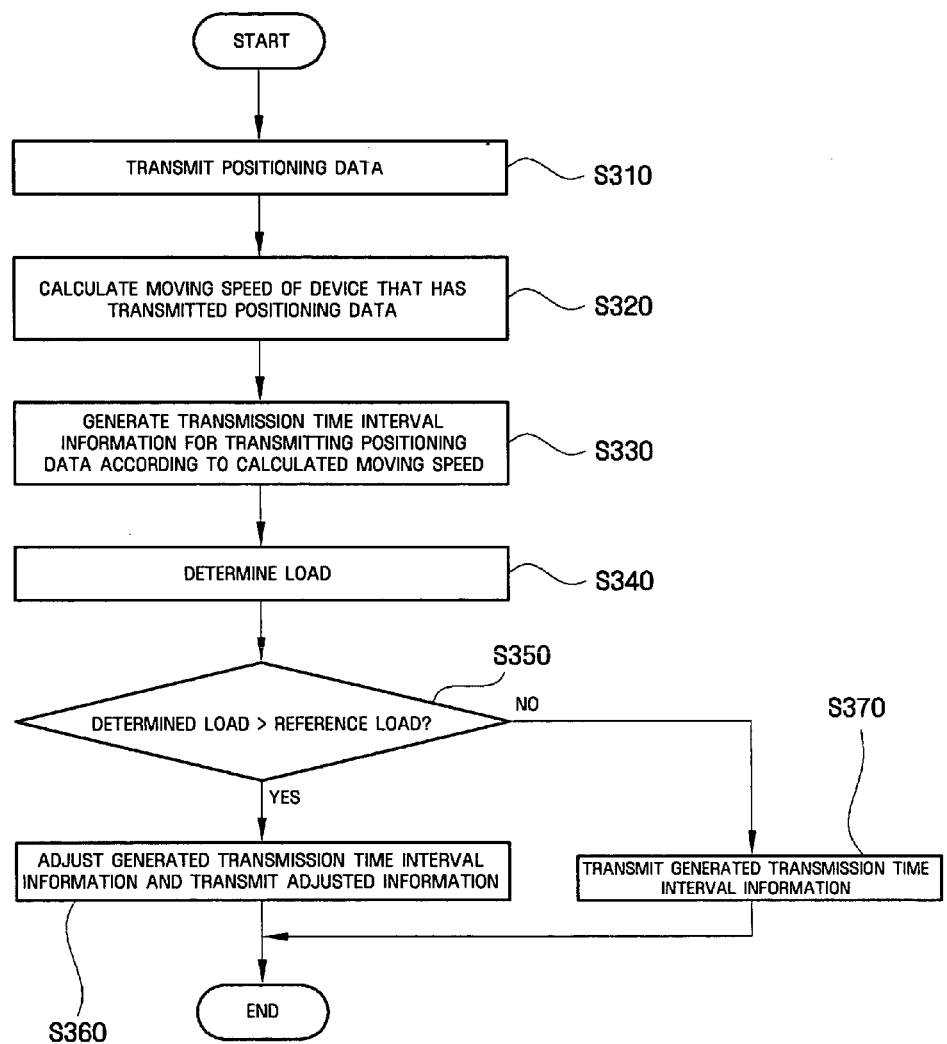
FIG. 9 is a flowchart illustrating a position-information transmitting method for a mobile device according to an exemplary embodiment of the present invention.

FIG. 9 is a flowchart illustrating a position-information transmitting method for a mobile device according to an exemplary embodiment of the present invention. The data-receiving module 210 receives positioning data from the position-information receiving apparatus 100 (S310). In this case, the data for positioning is received at intervals.

The moving-speed calculation module 240 of FIG. 6 calculates the moving speed of the position-information receiving apparatus 100 through the moving distance of the position-information receiving apparatus 100 obtained according to the time interval for receiving the data for positioning and the position information judged by the position judgment module 220 according to the data for positioning (S320).

Also, the moving-speed calculation module 240 generates the transmission time interval information for transmitting the data for positioning according to the calculated moving speed of the position-information receiving apparatus 100 (S330). In the exemplary embodiment, it is exemplified that the first reference speed is higher than the second reference speed. If the moving speed of the position-information receiving apparatus 100 exceeds the first reference speed, the moving-speed calculation module reduces the transmission time interval, and if the calculated moving speed is lower than the second reference speed, the moving-speed calculation module increases the transmission time interval. If the calculated moving speed is between the first reference speed and the second reference speed, the moving-speed calculation module maintains the transmission time interval.

On the other hand, the load-adjustment module 260 judges the load of the position-information transmitting apparatus 100 through Equation 1 as described above (S340).

If the judged load exceeds the reference load (S350), the load-adjustment module adjusts the generated transmission time interval information, and transmits the adjusted transmission time interval information through the data-transmitting module 250 (S360). If the judged load is below the reference load, the load-adjustment module transmits the generated transmission time interval information through the data-transmitting module 250 (S370). These operations are performed because if the load exceeds the reference load, sufficient QoS cannot be secured.

Figure 10:
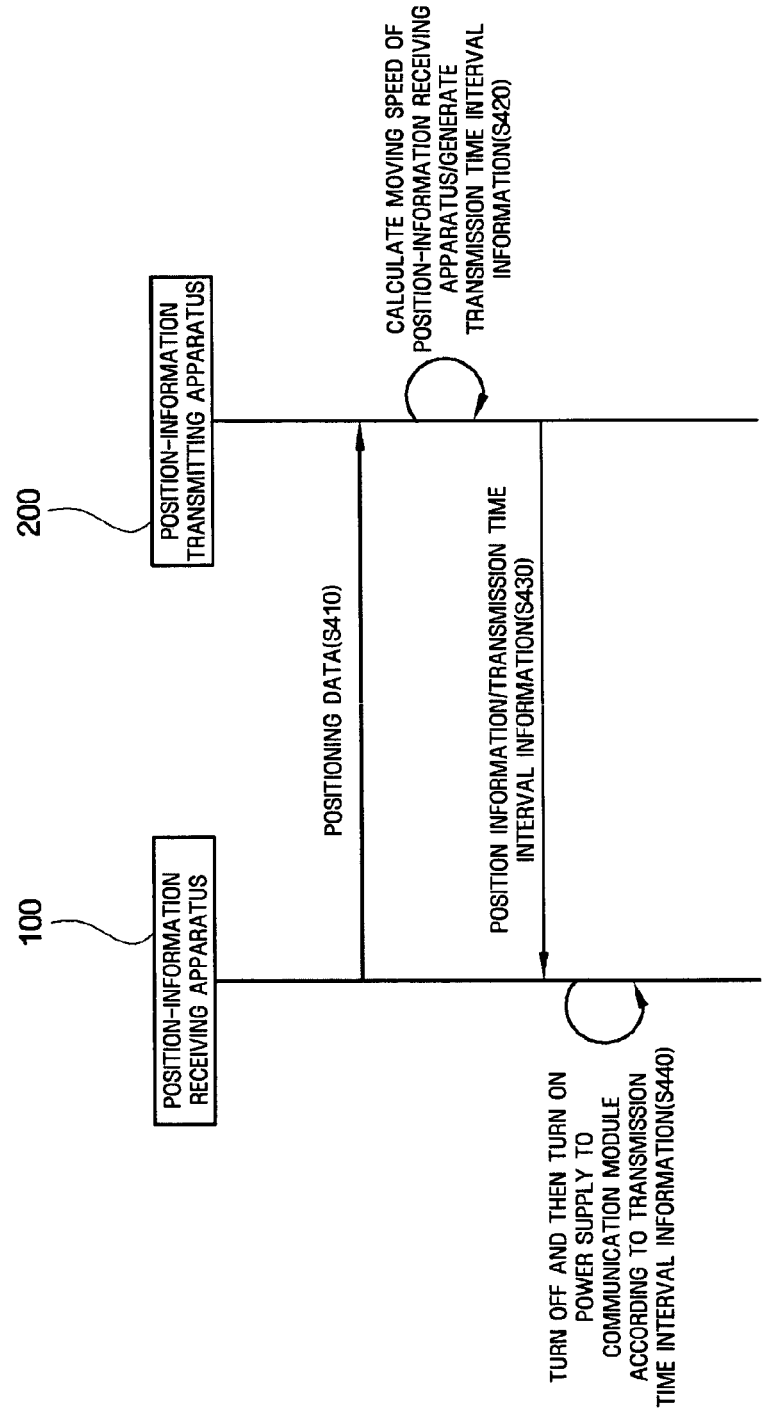
FIG. 10 is a view illustrating a data flow between a position-information receiving apparatus and a position-information transmitting apparatus according to an exemplary embodiment of the present invention.

FIG. 10 is a view illustrating a data flow between a position-information receiving apparatus and a position-information transmitting apparatus according to an embodiment of the present invention. If the position-information receiving apparatus 100 transmits the data for positioning to the position-information transmitting apparatus 200 (S410), the position-information transmitting apparatus 200 calculates the moving speed of the position-information receiving apparatus 100 according to the received data, and generates the data transmission time interval information according to the calculated moving speed (S420).

The position-information transmitting apparatus 200 transmits the position information and the transmission time interval information to the position-information receiving apparatus 100 (S430). The position-information receiving apparatus 100 turns of the power being supplied to the communication module 110 according to the transmission time interval information transmitted from the position-information transmitting apparatus 200, and then turns on the power supply to the communication module 110 (S440).

Then, if the power supply to the communication module 110 is in an on state, the operations S410 to S440 are repeated.

Figure 11:
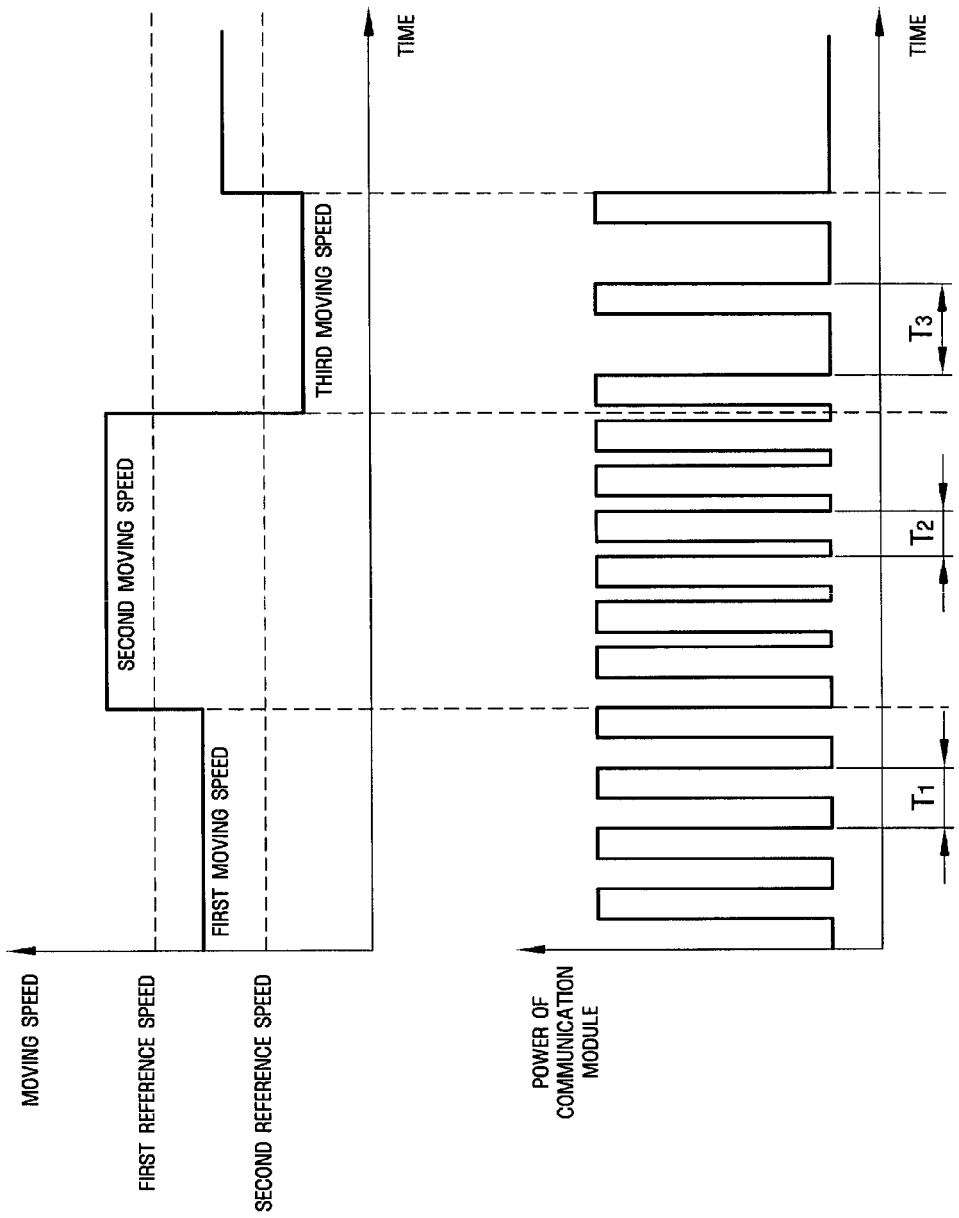
FIG. 11 is a view illustrating transmission time intervals of positioning data according to the moving speed of a position-information receiving apparatus according to an exemplary embodiment of the present invention.

FIG. 11 is a view illustrating transmission time intervals of positioning data according to the moving speed of a position-information receiving apparatus according to an exemplary embodiment of the present invention. It is exemplified that the position-information receiving apparatus 100 moves at a first moving speed, and the transmission time interval of the data for positioning in the period of the first moving speed is T1. The transmission time interval T1 corresponds to a time period in which the power supply to the communication module 110 is transited off after the transmission of the data for positioning, the power supply to the communication module is transited on to transmit the data for positioning, and then the power supply to the communication module is transited off again.

As illustrated in FIG. 11, if the moving speed of the mobile device, which has moved at the first moving speed, is increased to a second moving speed, which is higher than the first reference speed, the transmission time interval of the data for positioning that is transmitted from the position-information receiving apparatus 100 to the position-information transmitting apparatus 200 is substantially decreased to T2.

Thereafter, if the moving speed of the mobile device is decreased to a third moving speed, which is lower than the second reference speed, the transmission time interval of the data for positioning that is transmitted from the position-information receiving apparatus 100 to the position-information transmitting apparatus 200 is substantially increased to T3.

Accordingly, the transmission time interval of the data for positioning that is transmitted from the position-information receiving apparatus 100 to the position-information transmitting apparatus 200 is adjusted according to the moving speed of the position-information receiving apparatus 100, and thus the power consumption in the mobile device can be reduced. Also, if a load is increased due to the concentration of position-information receiving apparatuses on a specified position information transmitting apparatus, the transmission time interval information is readjusted to reduce the load, and thus the sufficient QoS can be secured.

In the exemplary embodiments, the term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

As described above, the mobile device positioning system and a method of operating the same according to the exemplary embodiments may (but are not required to) have at least one of the following advantages.

First, the power consumption of the mobile device can be substantially reduced by adjusting the transmission time interval of the data for positioning according to the moving speed of the mobile device.

Second, sufficient QoS can be secured by adjusting the load of the position-information transmitting apparatus through the number of mobile devices having requested the position information and the transmission time interval information.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A position-information receiving apparatus of a mobile device, comprising:
a communication module which enables data communications;
a position-information module which transmits positioning data to a position-information providing device through the communication module, and receives position information according to the transmitted positioning data through the communication module; and
a power control module which controls a power supply to the communication module according to the position information,
wherein the received position information comprises transmission time interval information for transmission of the positioning data according to a moving speed of the mobile device.

2. The position-information receiving apparatus of claim 1, wherein the power control module adjusts a time interval to supply the power to the communication module according to the transmission time interval information.

3. The position-information receiving apparatus of claim 1, wherein the position-information providing device calculates the moving speed based on the position information of the mobile device that is judged according to a reception time interval for receiving the positioning data and the positioning data, and generates the transmission time interval information according to the moving speed.

4. The position-information receiving apparatus of claim 3, wherein the position-information providing device adjusts the transmission time interval information according to a number of mobile devices having requested the position information and the transmission time interval information according to the respective mobile devices.

5. The position-information receiving apparatus of claim 1, further comprising a moving-speed calculation module that calculates a moving speed of the mobile device according to the position information.

6. The position-information receiving apparatus of claim 5, wherein the moving-speed calculation module calculates the moving speed of the mobile device according to a reception time interval of the position information and the position information.

7. The position-information receiving apparatus of claim 6, wherein the power control module generates transmission time interval information to transmit the positioning data according to the calculated moving speed, and adjusts a time interval for supplying the power to the communication module according to the transmission time interval information.

8. The position-information receiving apparatus of claim 1, wherein the position-information providing device adjusts the position information according to a number of mobile devices having requested the position information.

9. The position-information receiving apparatus of claim 1, wherein the position-information providing device adjusts the position information according to a number of mobile devices having requested the position information and the position information of the respective mobile devices.

10. The position information receiving apparatus of claim 1, wherein the position-information providing device adjusts the transmission time interval information according to a number of mobile devices having requested the position information and the transmission time interval information of the respective mobile devices.

11. The position information receiving apparatus of claim 1, wherein the position-information providing device adjusts the transmission time interval information according to a number of mobile devices having requested the position information.

12. A position-information receiving method of a mobile device, comprising:
transmitting positioning data to a position-information providing device;
receiving position information according to the positioning data; and
controlling a transmission time interval of the positioning data according to the position information,
wherein the receiving of the position information comprises receiving transmission time interval information for transmitting the positioning data according to a moving speed of the mobile device.

13. The position-information receiving method of claim 12, wherein the controlling of the transmission time interval comprises adjusting a time interval for supplying power required for the data transmission according to the transmission time interval information.

14. The position-information receiving method of claim 12, wherein the position-information providing device calculates the moving speed based on the position information of the mobile device, which is determined according to a reception time interval for receiving the positioning data and the positioning data, and generates the transmission time interval information according to the moving speed.

15. The position-information receiving method of claim 14, wherein the position-information providing device adjusts the transmission time interval information according to a number of mobile devices having requested the position information and the transmission time interval information according to the respective mobile devices.

16. The position-information receiving method of claim 12, further comprising:
    calculating a moving speed of the mobile device according to the received position information; and
    generating transmission time interval information to transmit the data according to the moving speed which is calculated.

17. The position-information receiving method of claim 16, wherein the calculating of the moving speed comprises calculating the moving speed of the mobile device according to a reception time interval of the position information and the position information.

18. The position-information receiving method of claim 16, wherein the controlling of the transmission time interval of the positioning data comprises adjusting a time interval for supplying a power required for the data transmission according to the transmission time interval.

19. The position-information receiving method of claim 12, wherein the position-information providing device adjusts the position information according to a number of mobile devices having requested the position information.

20. The position-information receiving method of claim 12, wherein the position-information providing device adjusts the position information according to a number of mobile devices having requested the position information and the position information of the respective mobile devices.

21. The position-information receiving method of claim 15, wherein the position-information providing device adjusts the transmission time interval information according to a number of mobile devices having requested the position information.

22. The position-information receiving method of claim 15, wherein the position-information providing device adjusts the transmission time interval information according to a number of mobile devices having requested the position information and the transmission time interval information of the respective mobile devices.

23. A computer-readable medium having a set of instructions for a position-information receiving method of a mobile device, the method comprising:
    transmitting positioning data to a position-information providing device;
    receiving position information according to the positioning data; and
    controlling a transmission time interval of the positioning data according to the position information,
    wherein the receiving of the position information comprises receiving transmission time interval information for transmitting the data according to a moving speed of the mobile device.

24. The computer-readable medium of claim 23, wherein the controlling of the transmission time interval comprises adjusting a time interval for supplying power required for the data transmission according to the transmission time interval information.

25. The computer-readable medium of claim 23, wherein the position-information providing device calculates the moving speed based on the position information of the mobile device, which is determined according to a reception time interval for receiving the positioning data, and generates the transmission time interval information according to the moving speed.

26. The computer-readable medium of claim 25, wherein the position-information providing device adjusts the transmission time interval information according to a number of mobile devices having requested the position information and the transmission time interval information according to the respective mobile devices.

27. The computer-readable medium of claim 23, further comprising:
    calculating a moving speed of the mobile device according to the position information; and
    generating transmission time interval information to transmit the positioning data according to the moving speed which is calculated.

28. The computer-readable medium of claim 27, wherein the calculating of the moving speed comprises calculating the moving speed of the mobile device according to a reception time interval of the position information.

29. The computer-readable medium of claim 27, wherein the controlling of the transmission time interval of the positioning data comprises adjusting a time interval for supplying a power required for the data transmission according to the transmission time interval.

* * * * *